United States Patent [19]
Gritter

[11] 3,964,086
[45] June 15, 1976

[54] COMPLEMENTARY COMMUTATION CIRCUIT FOR BIPOLAR INVERTER

[75] Inventor: David James Gritter, Elmhurst, Ill.

[73] Assignee: Borg-Warner Corporation, Chicago, Ill.

[22] Filed: June 30, 1975

[21] Appl. No.: 591,364

[52] U.S. Cl. .............................. 321/45 R; 321/45 C
[51] Int. Cl.² ...................................... H02M 7/515
[58] Field of Search ...................... 321/45 R, 45 C

[56] References Cited
UNITED STATES PATENTS

| | | | |
|---|---|---|---|
| 3,270,270 | 8/1966 | Yenisey | 321/18 |
| 3,337,741 | 8/1967 | Milsan | 321/45 R X |
| 3,500,170 | 3/1970 | Charrin et al. | 321/45 |
| 3,634,701 | 1/1972 | Studtmann | 321/45 R X |

Primary Examiner—William M. Shoop
Attorney, Agent, or Firm—James J. Jennings, Jr.

[57] ABSTRACT

A bipolar inverter circuit comprises power switches for providing alternating energy to the load notwithstanding the polarity of the energizing voltage. Each leg of the bipolar inverter or power conversion circuit includes a pair of power switches, each having a diode bridge with a thyristor coupled across the normal bridge output terminals to complete a path for current flow through the power switch when the thyristor is gated on. Each leg also has a complementary commutating circuit for turning off one of the thyristors whenever the other is gated on.

4 Claims, 3 Drawing Figures

COMPLEMENTARY COMMUTATION CIRCUIT FOR BIPOLAR INVERTER

BACKGROUND OF THE INVENTION

Recently much work has been done in the field of inverter-induction machine systems. It has been found that a conventional inverter circuit can be connected to operate not as an inverter, but to recirculate the reactive energy from an induction machine driven as a generator, thus replacing the conventional capacitor bank or additional machine used for excitation. Such a system is described and claimed in U.S. Pat. No. 3,829,758, entitled "AC-DC Generating System", which issued Aug. 13, 1974 to George H. Studtmann, and is assigned to the assignee of this invention. Subsequent work determined that by modulating the switching frequency of the inverter circuit (which is recirculating the reactive energy) to switch above and below the synchronous frequency of the machine itself, an alternating output voltage can be produced. Such an arrangement is described and claimed in the application of George H. Studtmann and Hary J. Venema, entitled "Modulated Induction Generator", filed Apr. 16, 1975, Ser. No. 568,746, and assigned to the assignee of this invention. Additional research effort determined that the induction machine when operated as a generator in the modulated induction generator system was in effect derated or utilized substantially below its nominal rating. It was found that the efficiency of the induction machine, and thus of the overall system, could be substantially enhanced by utilizing a bipolar inverter in the system, in place of a conventional converter. A bipolar inverter is one which provides alternating energy to the load connections, irrespective of the polarity of the energizing potential difference supplied to the inverter. Such use of a bipolar inverter with an induction machine is described and claimed in the copending application of George H. Studtmann, entitled "Bipolar Inverter with Induction Generator", filed June 27, 1975, Ser. No. 590,883, and assigned to the assignee of this invention. That application further explains that the bipolar inverter has substantial utility, not only in connection with an induction generator system, but also in a system which regenerates or returns power from a load through the inverter toward the source, and in an ac-to-ac or frequency heterodyne conversion system.

One disadvantage of the bipolar inverter system described and claimed in that application is that commutation for the thyristors in the power switches is provided by an auxiliary (aux-comm) circuit, and must be separately triggered on to effect commutation of the then-conducting thyristor.

It is therefore a primary object of this invention to provide a bipolar inverter or power conversion circuit in which the commutation for the thyristors is provided by a complementary commutation circuit.

A corresponding object of the invention is to provide such a complementary commutation circuit, with a reduced number of thyristors as contrasted to auxiliary commutation circuits, and a simplified logic circuit for turn-on of the thyristors as contrastedd to the control arrangements for the aux-comm circuits.

SUMMARY OF THE INVENTION

A bipolar power conversion circuit constructed in accordance with this invention is capable of passing energy to a load irrespective of the polarity of the energizing potential difference applied to the pair of bus conductors. Each leg of the power conversion circuit comprises a pair of power switches, each switch having a diode bridge circuit with four diodes. The input or load terminals of the two power switches are coupled to the bus conductors, and, at the common connections between the power switches, to a load connection. Across the switching terminals of each diode bridge is a thyristor, to effect load current conduction through the respective power switch when a d-c current path is provided between the switching terminals by turning on the thyristor.

Particularly in accordance with the present invention, a complementary commutation circuit is provided which includes first and second inductors, one coupled to the thyristor in each of the power switches. In addition, the commutation circuit comprises a first capacitor, coupled in series between the common connection between the thyristor and first inductor in the first power switch, and the common connection between the second thyristor and second inductor in the second power switch. In addition, a second capacitor is coupled between a switching terminal of the first power switch and a corresponding switching terminal in the second power switch.

THE DRAWING

In the several figures of the drawing, like reference numerals identified like components, and in the drawing.

GENERAL SYSTEM DESCRIPTION

Figure 1:
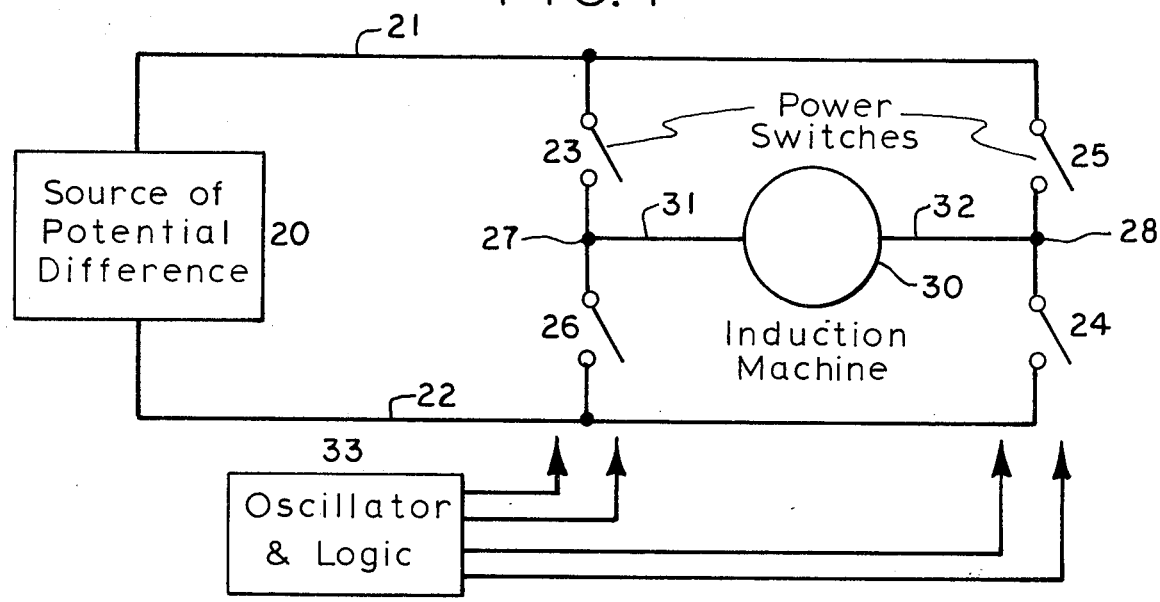
FIG. 1 is a simplified diagram of a bipolar power conversion circuit for energizing a load with ac energy irrespective of the polarity of the energizing potential difference supplied to the power conversion circuit.

FIG. 1 depicts a general arrangement of an ac-to-ac power conversion system which can be implemented with the circuit of this invention. The source 20 of potential difference must be an a-c source in such a system, but the source 20 is shown more generally because the power conversion circuit with a complementary commutation circuit has utility with other than ac-to-ac power conversion arrangements. As shown, a potential difference from the source 20 is applied over bus conductors 21, 22 to a power conversion arrangement including four power switches 23, 24, 25 and 26. The two power switches 23, 26 are connected together at a common terminal or load connection 27. Likewise the other power switches 25, 24 are connected together at a common terminal 28 which provides for another load connection. The induction machine 30 receives energy over conductors 31 and 32 from the load connections 27, 28 of the power conversion circuit. If the power switches 23–26 are true switches in the sense that they can pass energy in either direction, it is manifest that a-c voltage from source 20 can be switched by these power switches to provide an a-c voltage at a different frequency over the conductors 31, 32 to energize the induction machine or any other a-c load. However, when driving an induction motor, with the source 20 providing an alternating voltage at the first frequency and the power switches 23–26 being switched at a different frequency, the windings of the induction machine "see" both the sum and the difference frequencies in addition to the fundamental frequencies. Because the difference frequency is much lower, the induction machine can be driven as a motor from energy at this lower frequency, and the energy at the relatively higher frequencies will have little effect on the operation of the machine. The switching of the power switches is regulated by pulses applied from an oscillator-and-logic circuit 33, as is well understood by those skilled in this art. Oscillator-and-logic circuit 33 is represented generally to depict a means for applying gating impulses to the individual power switches 23–26. If the power switches are to be connected in a truly symmetrical arrangement, the power switches themselves must·be capable of carrying current in either direction, of blocking voltage of either polarity, and of being either gated on or turned off under any of these conditions. In the arrangement depicted in FIG. 1, it is assumed that when power switch 23 is on, then the switch 26 in the same leg of the circuit is off, and vice-versa. Thus it would save on power components and additionally simplify the logic circuit 33 if the power switch 23 can be automatically turned off when the other switch 26 in the same leg is gated on.

For purposes of this explanation and the appended claims, the power conversion circuit including the power switches 23–26 can be considered to have two legs, such as the leg 23, 26 and the other leg 25, 24. Those skilled in the art will readily appreciate that still another leg can be provided, and another load conductor added, to provide three-phase operation from a single source 20.

DETAILED DESCRIPTION OF THE INVENTION

Figure 2:
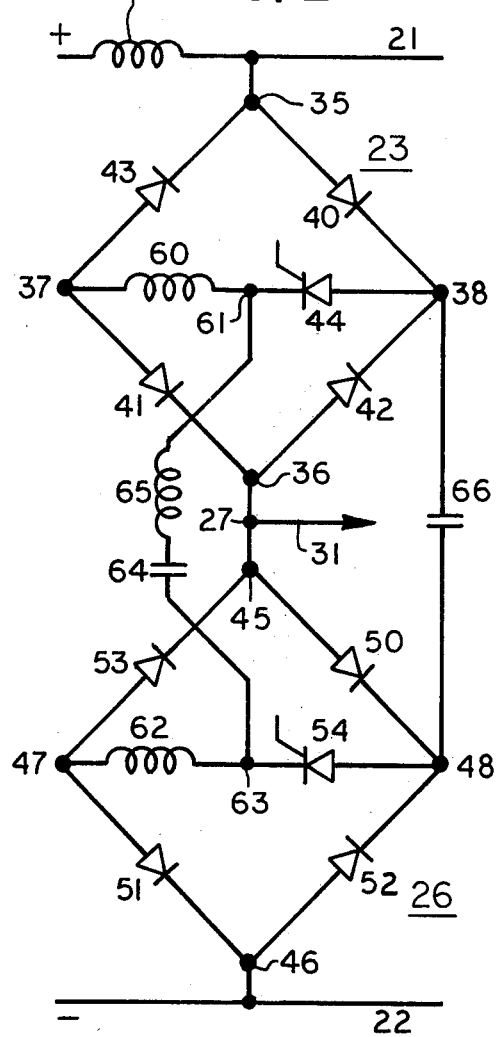
FIG. 2 is a schematic diagram of one leg of a power conversion circuit shown more generally in FIG. 1, including the complementary commutation circuit of this invention.

FIG. 2 depicts one leg of the power conversion circuit, including the power switches 23 and 26 represented more generally in FIG. 1. FIG. 2 depicts these switches coupled between the bus conductors 21, 22. Between the power switches is the load connection 27 to which one of the load conductors 31 is connected. An inductor 34 is shown connected in the bus conductor 21. The inductor 34 is not a part of the invention and is not necessary to implementation and operation of the invention.

The first power switch 23 is connected between bus conductor 21 and load connection 27. A portion of the power switch includes a diode or rectifier bridge having a pair of load terminals 35, 36 and a pair of switching terminals 37, 38. The power switch 23 further comprises four diodes 40–43 connected as shown to conduct current between the load terminals 35, 36 whenever a d-c circuit is completed between the switching terminals 37, 38. This first power switch also has a thyristor 44 coupled between the switching terminals 37, 38 to complete such a d-c circuit as the thyristor 44 is gated on.

Similarly, the second power switch 26 is connected between the load connection 27 and the other bus conductor 22. Power switch 26 includes a pair of load terminals 45, 46 and a pair of switching terminals 47, 48. Four diodes 50–53 are connected in the power switch 26 to conduct current between the load terminals 45, 46 when a d-c circuit is completed between the switching terminals 47, 48. For this purpose a second thyristor 54 is connected as shown between the switching terminals 47, 48 to complete such a d-c path when the thyristor 54 is gated on. Of course, in practice there may not be any physical "terminals" such as the load terminals 45, 46 and the switching terminals 47, 48, if a rectifier bridge is constructed in a single integrated package or other arrangement, but such terminology is useful for purposes of describing and claiming the invention.

Particularly in accordance with the present invention, the power conversion leg includes a complementary commutation circuit. The commutation circuit includes a first inductor 60, shown coupled between switching terminal 37 and the cathode of first thyristor 44 in the first power switch. There is a common connection 61 between the inductor 60 and the thyristor 44. Similarly, a second inductor 62 of the complementary commutation circuit is coupled in series with a second thyristor 54 between the switching terminals 47, 48 in the second power switch, with a common connection 63 between the inductor 62 and the cathode of thyristor 54. The commutation circuit has a first capacitor 64 coupled in series with a third inductor 65 between the connections 61, 63 in the respective power switches. A second capacitor 66 is coupled between the switching terminal 38 in the first power switch and the corresponding switching terminal 48 in the second power switch. Although the inductors 60, 62 appear to be connected in the power switches, it is emphasized that these inductors are in fact part of the complementary commutation circuit. In addition, although a third inductor 65 is depicted and is presently used (for $di/dt$ protection) in the best mode now known for operating the invention, it is not necessary to the basic construction and implementation of the invention.

OPERATION OF THE INVENTION

It is initially assumed that the power conversion circuit has been energized and the source 20 is providing a potential difference which is positive on bus conductor 21 with respect to the potential on conductor 22. As a practical matter, it is simple to ensure, through the circuitry in the logic arrangement 33, that the thyristor 44 in the upper power switch is gated on initially to charge capacitor 64. When thyristor 44 is turned on, current flows from bus conductor 21 over diode 40, thyristor 44, inductor 65, capacitor 64, inductor 62 and diode 51 to conductor 22. This charges capacitor 64 positive on its upper plate, adjacent inductor 65, with respect to the potential on the other plate. It is noted that even if thyristor 44 were not initially triggered to charge the capacitor, when the thyristor 44 is initially gated on to conduct load current from the bus over diode 40, thyristor 44, inductor 60, diode 41 and load connection 27 to the load conductor, the previously described path for charging capacitor 64 is also completed and it thus will be charged as described. There is no path to charge capacitor 66 at this time.

The second thyristor 54 in the second power switch 26 can now be fired, by a pulse from the logic circuit 33, to turn on this power switch and, through the complementary commutating circuit, turn off the first thyristor 44. As thyristor 54 is turned on, it completes a path for discharge of capacitor 64. Initially discharge current from capacitor 64 begins to build up and discharge through inductor 65, the reverse direction of thyristor 44, capacitor 66, and thyristor 54 to the other plate of capacitor 64. When the amplitude of the discharge current from capacitor 64 builds up to the level of the load current following when thyristor 54 is turned on, thyristor 44 is turned off, and the path for discharge of capacitor 64 extends through inductor 65, inductor 60, diode 41, diode 50, and thyristor 54 to the other side of capacitor 64. In practice inductor 65 has a low value of inductance, and thus the rise of the discharge current is rapid. The conducting thyristor 54 also completes a charging path for the capacitor 66 from bus conductor 21 over diode 40, capacitor 66, thyristor 54, inductor 62, and diode 51 to the other bus conductor 22. Capacitor 66 begins to charge to the level of the bus voltage. Thus, ignoring the value of inductor 65 which is relatively small, the turn-off voltage for thyristor 44 is substantially equal to the difference between the voltages across the capacitors 64 and 66. Accordingly, the turn-off time for thyristor 44 ends at the time that the voltages across these two capacitors are equal.

When the voltage across capacitor 66 has reached the bus voltage, this capacitor will no longer continue charging. If there is any excess energy trapped in inductor 62 by reason of the charging current previously flowing through this inductor, it will circulate around through diodes 51, 52 and thyristor 54 until it is dissipated. However, in inductor 60, there is still some load current flowing even when the potential across capacitor 64 has reversed. Accordingly, this excess energy will be transferred to capacitor 64 as an overcharge. After this commutation cycle, the load current will then flow out of the load over conductor 31, diode 50, thyristor 54, inductor 62, and diode 51 to the bus conductor 22. Capacitor 64 is charged with a potential on its lower plate positive with respect to that on its upper, and capacitor 66 has a potential on its upper plate positive with respect to that on the lower.

With thyristor 54 now conducting, it is assumed that it is desired to turn off thyristor 54 and have thyristor 44 turned on. To accomplish this a gate pulse is applied to thyristor 44 from the logic circuit 33. This completes a discharge path for current flow from the upper plate of capacitor 66 through thyristor 44, inductor 65, capacitor 64, and the reverse direction of thyristor 54 to the other side of capacitor 66. As soon as the level of this discharge current builds up to the level of the load current, thyristor 54 is turned off. The discharge current for capacitor 66 continues to flow through thyristor 44, inductor 60, and diodes 41, 50 to the other side of capacitor 66 until this capacitor is discharged down to zero voltage. Capacitor 66 is clamped at zero volts and cannot charge in the opposite direction, and thus this capacitor only swings between the bus voltage and zero volts during the commutation cycles. While capacitor 66 is discharged, capacitor 64 is also discharged over a circuit extending from bus conductor 21 over diode 40, thyristor 44, inductor 65, capacitor 64, inductor 62, and diode 51 to conductor 22. Capacitor 64 is then recharged over the same circuit with a voltage of the opposite polarity, plus on its upper plate with respect to the lower. Accordingly the circuit is now back in its previous condition; capacitor 64 is charged positive on the upper plate with respect to the lower, capacitor 66 is at zero volts, and load current is flowing from the bus conductor 21 through diode 40, thyristor 44, inductor 60, diode 41, load connection 27 and load conductor 31 to the load.

An inductor 34 may be placed in series with one branch of the bus, in a practical circuit application. This has the effect of slowing the charging rate of capacitor 66, thus insuring a longer turn-off time for thyristor 44, a smaller amount of energy trapped in inductor 62 when capacitor 66 is charged to the bus voltage, and a smaller overcharge on capacitor 64 at the end of the commutation interval for thyristor 54. If the inductor 34 has an inductance of the order of ten times the inductance of inductor 60 or 62, then the commutation process for turn-off of thyristor 54 is different from that already described. When thyristor 54 is turned off, inductor 34 absorbs the bus voltage, so the effective voltage between the bus conductors is zero. This causes the discharge path for capacitor 64, during turn-off of thyristor 54, to change as follows.

With thyristor 54 conducting, it is assumed that it is desired to turn off thyristor 54 and have thyristor 44 turned on. Just as before, a gate pulse is applied to thyristor 44 from the logic circuit 33. This completes a discharge path for current flow from the upper plate of capacitor 66 through thyristor 44, inductor 65, capacitor 64, and the reverse direction of thyristor 54 to the other side of capacitor 66. As soon as the level of this discharge current builds up to the level of the load current, thyristor 54 is turned off, and current flows through inductor 62 and diodes 51, 52 instead of thyristor 54. The discharge current for capacitor 66 continues to flow until capacitor 66 is discharged down to zero voltage. Capacitor 66 is clamped at zero volts and cannot charge in the opposite direction. and thus this capacitor only swings between the bus voltage and zero volts during the commutation cycles. After capacitor 66 is clamped, the current from capacitor 64 continues to flow from its lower plate through inductor 62, diode 53, diode 42, thyristor 44 and inductor 65 back to the other plate of capacitor 64, as capacitor 64 recharges with the opposite polarity, with plus voltage on its upper plate with respect to the lower. Accordingly the circuit is now back in its previous condition; capacitor 64 is charged positive on the upper plate with respect to the lower, capacitor 66 is at zero volts, and load current is flowing from the bus conductor 21 through diode 40, thyristor 44, inductor 60, diode 41, load connection 27 and load conductor 31 to the load.

Therefore with inductor 34 in the bus the source does not add energy to capacitor 64 during the commutation interval. There is a small amount of energy stored in inductor 34 during this process, which energy ends up as an overcharge on capacitor 64. Nevertheless there is a net reduction of the overcharge, because the time that inductor 34 is effectively across the bus is minimal.

The addition of inductor 34 also tends to overcharge capacitor 66 during commutation of thyristor 44. However this does not significantly affect circuit operation, and the advantage achieved with inductor 34 outweigh the disadvantages.

Figure 3:
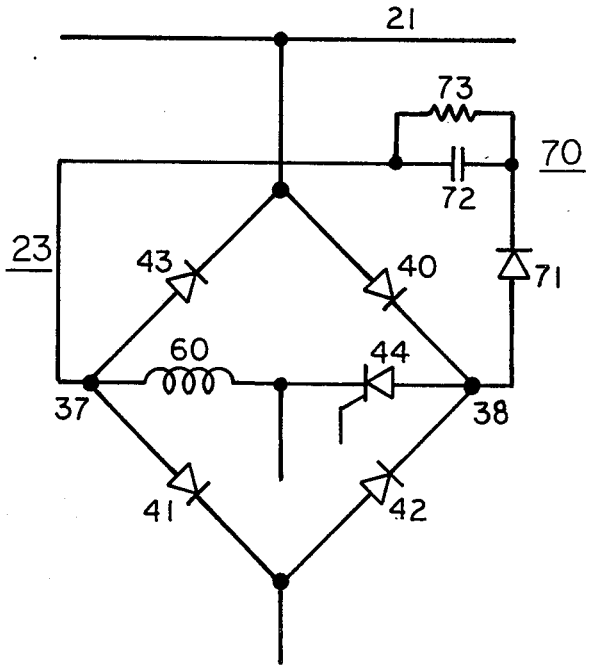
FIG. 3 is a schematic diagram of a diode snubber circuit which is useful with the invention.

FIG. 3 shows a snubber circuit 70 coupled across the switching terminals 37, 38 of power switch 23. A similar snubber circuit is coupled across the switching terminals of power switch 26, to prevent large transients across the diodes in the power switches at the end of the commutation time. Snubber circuit 70 has a diode 71 coupled in series with a capacitor 72, and a resistor 73 is coupled in parallel with capacitor 72. At present such snubber circuits are employed in the best mode for practicing the invention.

TECHNICAL ADVANTAGES

As contrasted to independent or aux-comm commutation circuits, the complementary commutation circuit of this invention provides advantages by reducing the number of power components required and simplifying the circuitry in the logic or gating control circuit. Air core inductors can be utilized for the inductors 60, 62 and 65, reducing the expense and physical size of the circuit. The circuit can be utilized as shown in connection with FIG. 1 to energize an induction generator, or when this unit is operated as a motor, energy can regenerate through the legs of the power conversion circuit. Another leg can be added to the circuit of FIG. 1, in a manner apparent to those skilled in the art, to provide three-phase a-c energy from a single-phase source 20.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled."

While only a particular embodiment of the invention has been described and claimed herein, it is apparent that various modifications and alterations of the invention may be made. It is therefore the intention in the appended claims to cover all such modifications and alteratons as may fall within the true spirit and scope of the invention.

What is claimed is:

1. A bipolar power conversion circuit capable of passing energy to a load irrespective of the polarity of an energizing potential difference applied to a pair of bus conductors over which the power conversion circuit is energized, in which each leg of the power conversion circuit comprises:

a first power switch, coupled between one of the bus conductors and a load connection, including a pair of load terminals, a pair of switching terminals, four diodes connected to conduct current between the load terminals when a d-c circuit is completed between the switching terminals, and a first thyristor connected to complete the d-c circuit as it is gated on;

a second power switch, coupled between the load connection and the other bus conductor, including a pair of load terminals, a pair of switching terminals, four diodes connected to conduct current between the load terminals when a d-c circuit is completed between the switching terminals, and a second thyristor connected to complete the d-c circuit as the thyristor is gated on; and a complementary commutation circuit, including a first inductor, coupled in series with the first thyristor between the switching terminals in the first power switch, a second inductor, coupled in series with the second thyristor in the second power switch, a first capacitor, with one plate coupled to the common connection between the first thyristor and the first inductor, and the other plate coupled to the common connection between the second thyristor and the second inductor, and a second capacitor, coupled between one switching terminal of the first power switch and one switching terminal of the second power switch, which complementary commutation circuit is effective to turn off the conducting one of the first and second thyristors when the other of the thyristors is gated on.

2. A bipolar power conversion circuit as claimed in claim 1, and further comprising a third inductor, coupled in series with the first capacitor between said common connections.

3. A bipolar power conversion circuit as claimed in claim 1, and further comprising a pair of snubber circuits, each coupled to the switching terminals of one power switch circuit, each snubber circuit comprising a series circuit including a diode and a capacitor, and a resistor coupled in parallel with the capacitor.

4. A bipolar power conversion circuit as claimed in claim 1, and further comprising a fourth inductor, connected in series with one of the bus conductors.

* * * * *